June 25, 1929.    R. A. LIGHT ET AL    1,718,242
SEGMENTAL METALLIC PACKING RING
Filed Jan. 14, 1925
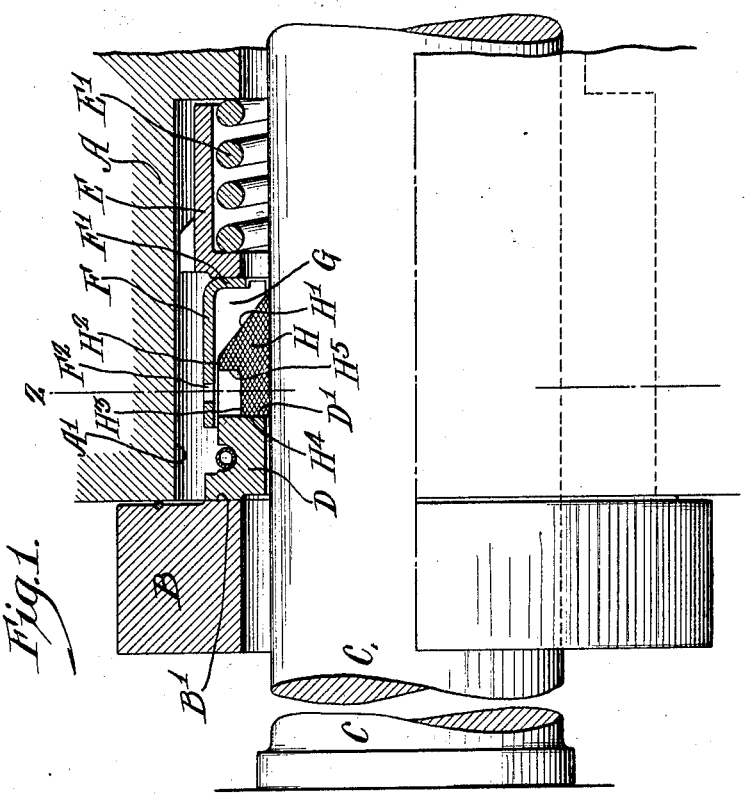
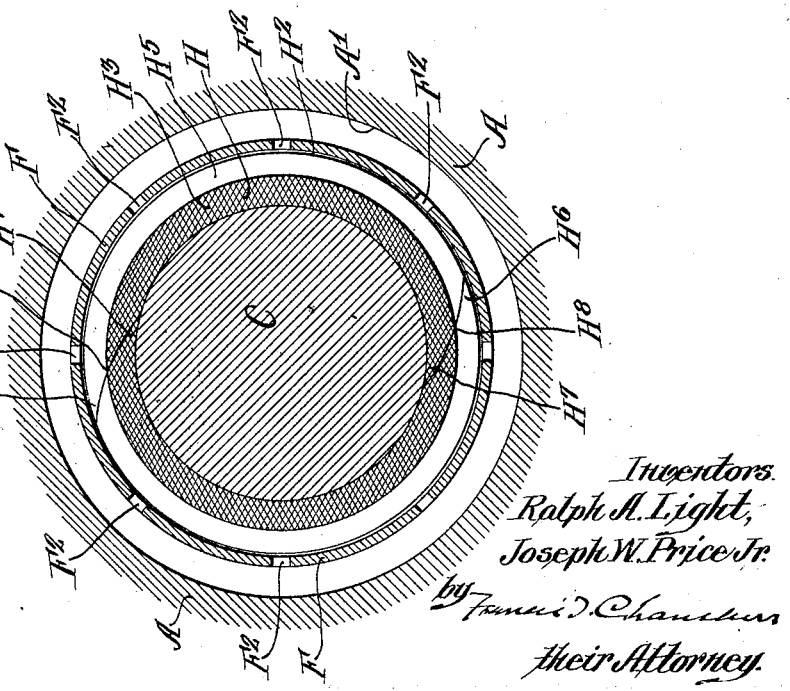
Inventors
Ralph A. Light,
Joseph W. Price Jr.
by Francis D. Chauncey
their Attorney Patented June 25, 1929.

1,718,242

UNITED STATES PATENT OFFICE.

RALPH A. LIGHT AND JOSEPH W. PRICE, JR., OF PHILADELPHIA, PENNSYLVANIA, ASSIGNORS TO THE UNITED STATES METALLIC PACKING COMPANY, OF PHILADELPHIA, PENNSYLVANIA, A CORPORATION OF PENNSYLVANIA.

SEGMENTAL METALLIC PACKING RING.

Application filed January 14, 1925. Serial No. 2,252.

Our invention relates to segmental metallic packing rings and is especially adapted for use in connection with rings of the kind described in the King Patent No. 914,426 of March 9, 1909, in which a two segment ring is formed of segments having tapered overlapping ends with curved contacting faces shaped to interlock with each other when the ring is assembled on a rod.

The objects of our invention are to provide right angle abutting faces at one end of the ring of materially less diameter than the larger diameter of the ring and, at the same time, to so balance the ring with respect to the steam pressure that the pressure of its abutting face against this bearing will be no greater per square inch than is the case in the standard forms of packing rings. A further object is to so construct the ring that its conical end will be of ordinary standard dimensions, though materially greater than the external diameter of the right angled abutting end, so that a good and preferably interlocking engagement is made between the contacting ends of the ring segments and, at the same time, the taper of the overlapping ends is not made so great as to produce very thin edges.

The nature of our invention will be best understood as described in connection with the drawings in which it is illustrated and in which Figure 1 is a segmental elevation of the ordinary and standard packing mechanism and of our improved ring as used in connection therewith, and Figure 2 is a cross section on the line 2—2 of Fig. 1.

A indicates the end of a steam cylinder having formed in it a gland chamber A'. B is the ordinary cover plate secured to the end of the cylinder and provided with an inner abutting face B'. C is the piston rod. D, a ring abutting against the face B' and having an inner abutting face D'. E is a spring casing enclosing a spiral spring E'. F is a retaining shell having a flange F' which rests against the end of the spring casing and formed, as shown, with perforations $F^2$. G is a conical cup fitting in the retaining shell F against which the conical end of the packing abuts. H is our improved packing ring, made up of segments, preferably two, as shown, having a conical end H' of ordinary dimensions, a short cylindrical intermediate section $H^2$ of the diameter of the larger diameter of the cone and its opposite end made up of a cylindrical portion $H^3$ of materially less diameter than the larger diameter of the conical portion and having a right angled abutting face $H^4$ which abuts against the ring D and is, of course, of the diameter of the cylindrical portion $H^3$. $H^5$ indicates the upright wall uniting the cylindrical portions $H^2$ and $H^3$. The ring segments are formed with tapered contacting ends $H^6$ and $H^7$, with preferably curved contacting faces, as indicated at $H^8$ which, for the best results, should be formed as described in the King patent before mentioned, so that the lapping ends will interlock when the ring segments are assembled on a rod.

In operation steam is admitted freely to the space surrounding the cylindrical portion $H^3$ of the ring and with the result that acting against the face $H^5$ this steam will counterbalance the steam pressure acting against the conical face of the ring through the cup G so that in our new construction the abutting face $H^4$ of the ring is not subjected to a greater pressure per square inch than would be the case if this abutting surface were of the full diameter of the ring. By diminishing the diameter of this abutting end of the ring, we secure a steam tight joint between the abutting end $H^3$ of the abutment D' promptly and effectually and at the same time we save a considerable amount of metal in the make-up of the ring.

By maintaining the conical end of the ring with standard dimensions, we are enabled to diminish the taper of the tapered ends $H^6$ and $H^7$ and avoid the formation of such fine edges as are found to be objectionable, owing to their liability to bend and break.

Having now described our invention, what we claim as new and desire to secure by Letters Patent, is:

A segmental metallic packing ring having when its segments are assembled a conical front end and a rear end of symmetrical contour and of materially less diameter than the maximum diameter of its conical end, the segments of the ring having curved and tapered contacting ends adapted to slide on each other as the ring contracts to take up wear.

RALPH A. LIGHT.
JOSEPH W. PRICE, Jr.